Patented Oct. 19, 1943

2,332,277

UNITED STATES PATENT OFFICE 2,332,277

PROCESS FOR BRIQUETTING MAGNESIUM AND MAGNESIUM ALLOY SCRAP

Max Stern, New York, N. Y.

No Drawing. Application April 4, 1941, Serial No. 386,844. In France January 26, 1940

2 Claims. (Cl. 75—67)

The invention relates to an improved process for shaping into solid bodies or for briquetting magnesium and magnesium alloy scrap.

More particularly the invention relates to a novel process of briquetting magnesium scrap and magnesium alloy scrap without the use of binding or agglomerating agents.

The instant application is a continuation-in-part of my patent application Ser. No. 356,665, which has matured into Patent No. 2,302,980.

It is known in the manufacture of ferroalloy briquettes, e. g., ferrosilicon or ferromanganese briquettes to add powdered magnesium as a binder. The thus produced briquettes represent a mass consisting of powdered ferroalloys and disseminated magnesium powder, the percentage of the latter in the briquettes varying between 10 to 20%.

In contradiction to the just recited process of making ferroalloy briquettes by the application of magnesium powder as a binder, it is the object of this invention to produce briquettes consisting of magnesium or magnesium alloy scrap only without the addition of binding agents.

It is a further object of the invention to manufacture strongly coherent briquettes from magnesium and magnesium alloy scrap representing compact homogeneous solid bodies which have practically the same specific weight as the virgin metals.

With this purpose in view the magnesium or magnesium alloy scrap is compressed into briquettes at a temperature ranging between 250° to about 500° C. and preferably between 280° and 350° C.

I have found that in most cases a temperature which lies at about 300° C. is most suitable. In spite of this low operating temperature a pressure of only .4 to 1.5 t. sq./cm. is required.

I am also aware of the existence of methods for briquetting hard metal and particularly hard metal carbide powders with the addition of auxiliary binding metals which mixtures during the compression are heated to very high alloying temperatures of about 2000° C.

The coherence in the case of the present invention is not due to an alloying procedure, but to a purely mechanical phenomenon and the invention is based on the surprising recognition that by a simple mechanical compressing method at a comparatively low temperature and with a comparatively low pressure briquettes may be produced from magnesium scrap or magnesium alloy scrap which may rightly be substituted for the virgin metals.

Furthermore, my method presents the overwhelming advantage over the recovery of magnesium or its alloys from scrap by remelting that the danger of an ignition of the molten scrap is avoided.

The scrap is preferably subjected to a refining and deoxidizing heat treatment at a comparatively low temperature in a reducing atmosphere before it is transported into the pressing equipment. It is also advisable to prevent the access of the oxygen to the pretreated scrap in order to introduce into the pressing equipment a material which is practically free from oxide.

This result may be obtained by conducting the heating treatment in muffle kilns or furnaces or in ovens wherein the scrap is enclosed in airtight crucibles or receptacles. However, it is generally sufficient if the scrap is protected in any suitable manner from the oxidizing influence of the surrounding air and from the danger of ignition.

The scrap is conveyed in a hydraulic press or in a hammer provided die and compressed therein at the correct temperature to the required shape. The pressing equipment may be preferably provided with an electrical heating device as the control of the operating temperature during the pressing procedure is of great importance. Variations of the once established treating temperature should be avoided. In other words, after the proper pressure temperature has once been ascertained by a simple test for a certain type of the scrap, this temperature should be constantly maintained during the pressing operation in order to obtain optimum results.

Example

Magnesium turnings are charged into a rotary furnace provided with an external heating device, a reducing atmosphere is maintained in the furnace, the turnings are hereby deoxidized and cleaned; then they are transported from this pretreating furnace directly into a press and the access of air should possibly be avoided during the transport.

The turnings are maintained in the press at a predetermined pressing temperature which in the case of magnesium scrap is approximately 320° C. A pressure of .4 t. sq./cm. is applied.

The resulting magnesium briquettes represent compact homogeneous solid bodies; they have the same appearance as the virgin metal and a specific weight of 1.72.

I claim:

1. A method for treating fine magnesium or magnesium alloy scrap such as turnings comprising pretreating the scrap at a temperature to clean the scrap and to remove the contaminations, transporting the still inflammable cleaned scrap into a pressing device, compressing the scrap therein without the use of binders at a temperature between 250° to 500° C. and producing hereby a compact magnesium or magnesium alloy body which is not inflammable.

2. A method for treating fine magnesium or magnesium alloy scrap such as turnings comprising pretreating the scrap at a temperature to clean the scrap and to remove the contaminations, transporting the still inflammable cleaned scrap into a pressing device, compressing the scrap therein without the use of binders at a temperature between 280 to 350° C. and producing hereby a compact magnesium or magesium alloy body which is not inflammable.

MAX STERN.